(12) United States Patent
Kee et al.

(10) Patent No.: US 11,459,425 B2
(45) Date of Patent: Oct. 4, 2022

(54) COMPOSITION FOR PREPARING HYBRID RESIN, HYBRID RESIN AND HYBRID RESIN FILM PREPARED THEREFROM

(71) Applicants: SAMSUNG DISPLAY CO., LTD., Yongin-si (KR); SOGANG UNIVERSITY RESEARCH FOUNDATION, Seoul (KR)

(72) Inventors: Inseo Kee, Yongin-si (KR); Bongjin Moon, Seoul (KR); Hyoungwook Lee, Yongin-si (KR); Nana Kang, Seoul (KR); Hyunseo Shin, Seoul (KR)

(73) Assignees: Samsung Display Co., Ltd., Yongin-si (KR); Sogang University Research Foundation, Seoul (KR)

( * ) Notice: Subject to any disclaimer, the term of this patent is extended or adjusted under 35 U.S.C. 154(b) by 572 days.

(21) Appl. No.: 15/154,887

(22) Filed: May 13, 2016

(65) Prior Publication Data

US 2017/0096528 A1    Apr. 6, 2017

(30) Foreign Application Priority Data

Oct. 2, 2015   (KR) .......................... 10-2015-0139112

(51) Int. Cl.
   *C08G 65/26* (2006.01)
   *C08G 65/14* (2006.01)
   *C08G 65/334* (2006.01)
   *C08G 65/336* (2006.01)
   *C09K 9/02* (2006.01)

(52) U.S. Cl.
   CPC ......... *C08G 65/2639* (2013.01); *C08G 65/14* (2013.01); *C08G 65/334* (2013.01); *C08G 65/336* (2013.01); *C09K 9/02* (2013.01); *C09K 2211/14* (2013.01); *C09K 2211/1425* (2013.01)

(58) Field of Classification Search
   CPC .. C08G 65/2639; C08G 65/14; C08G 65/334; C08G 65/336; C09K 9/02; C09K 2211/14; C09K 2211/1425
   USPC ........... 385/128; 351/177; 428/414; 252/583
   See application file for complete search history.

(56) References Cited

U.S. PATENT DOCUMENTS

| | | | |
|---|---|---|---|
| 3,361,706 A * | 1/1968 | Meriwether | G03C 1/73 252/586 |
| 6,113,814 A * | 9/2000 | Gemert | C08K 5/1545 252/586 |
| 6,243,523 B1 * | 6/2001 | Aloisio | C03C 25/106 385/128 |
| 6,551,710 B1 * | 4/2003 | Chen | C08F 246/00 428/412 |
| 6,639,039 B1 | 10/2003 | Fries et al. | |
| 2005/0196618 A1 * | 9/2005 | Knox | C08G 18/0823 428/414 |
| 2007/0173614 A1 * | 7/2007 | Mizuta | C08L 71/02 525/403 |
| 2007/0285617 A1 * | 12/2007 | Mills | B29D 11/00355 351/159.74 |
| 2011/0034581 A1 | 2/2011 | Bae et al. | |
| 2012/0153229 A1 | 6/2012 | Bae et al. | |
| 2013/0295563 A1 * | 11/2013 | Nam | G01N 21/658 435/6.11 |

FOREIGN PATENT DOCUMENTS

| | | | |
|---|---|---|---|
| KR | 10-2004-0074471 A | | 8/2004 |
| KR | 10-2012-0069919 A | | 6/2012 |
| WO | WO2004070501 | * | 8/2004 |

OTHER PUBLICATIONS

Obermeier et al., "Poly(ethylene glycol-co-allyl glycidyl ether)s: A PEG-Based Modular Synthetic Platform for Multiple Bioconjugation", Bioconjugate Chemistry, 22(3), 436-444 (2011).

Kwak et al.,. "Sol-gel derived dye-bridged hybrid materials for white luminescence", Journal of Sol-Gel Science and Technology, vol. 65 (1), 46-51 (2013).

Schafer et al., "Reversible Light-, Thermo-, and Mechano-Responsive Elastomeric Polymer Opal Films", Chemistry of Materials, vol. 25 (11), 2309-2318 (2013).

Obermeier et al., "Multifunctional Poly(ethylene glycol)s", Functional Materials, Angewandte Chemie International Edition, vol. 50 (35), 7988-7997 (2011).

* cited by examiner

*Primary Examiner* — Ling Siu Choi
*Assistant Examiner* — Ronald Grinsted
(74) *Attorney, Agent, or Firm* — Lewis Roca Rothgerber Christie LLP

(57) ABSTRACT

A composition for preparing a hybrid resin includes: a polymer including a repeating unit derived from allyl glycidyl ether; a thiol-based compound; and a photoinitiator, wherein the thiol-based compound is selected from a first thiol-based compound including a silyl group, a second thiol-based compound including a moiety derived from a photochromic compound, and a combination thereof. A hybrid resin, and a hybrid resin film prepared from the composition are also disclosed.

19 Claims, 8 Drawing Sheets
(2 of 8 Drawing Sheet(s) Filed in Color)

(1) (2) (3)

COMPOSITION FOR PREPARING HYBRID RESIN, HYBRID RESIN AND HYBRID RESIN FILM PREPARED THEREFROM

CROSS-REFERENCE TO RELATED APPLICATION

This application claims the benefit of Korean Patent Application No. 10-2015-0139112, filed on Oct. 2, 2015, in the Korean Intellectual Property Office, the entire content of which is incorporated herein by reference.

BACKGROUND

1. Field

One or more exemplary embodiments relate to a composition for preparing a hybrid resin, a hybrid resin and a hybrid resin film prepared therefrom.

2. Description of the Related Art

Recently, as the demand for various electronic materials increases, there is an increasing need for replacing existing materials through the development of new materials. In particular, organic-inorganic hybrid materials may utilize features of both of organic materials and inorganic materials, beyond the limits of existing materials. Thus, organic-inorganic hybrid materials are expected to be widely applicable as a material that may minimize or reduce the disadvantages of existing materials.

SUMMARY

One or more exemplary embodiments include a composition for preparing a hybrid resin having excellent transmittance, a hybrid resin and a hybrid resin film prepared therefrom.

One or more exemplary embodiments include a composition for preparing a hybrid resin having a photochromic property, a hybrid resin and a hybrid resin film prepared therefrom.

Additional aspects of embodiments will be set forth in part in the description which follows and, in part, will be apparent from the description, or may be learned by practice of the presented embodiments.

According to one or more exemplary embodiments, a composition for preparing a hybrid resin includes a polymer containing a repeating unit derived from allyl glycidyl ether; a thiol-based compound; and a photoinitiator, wherein the thiol-based compound is selected from a first thiol-based compound containing a silyl group, a second thiol-based compound containing a moiety derived from a photochromic compound, and a combination thereof.

According to one or more exemplary embodiments, a hybrid resin may be formed by photocuring by a thiol-ene reaction between the polymer and the thiol-based compound in the composition for preparing a hybrid resin.

According to one or more exemplary embodiments, a hybrid resin film may be formed by heat curing the hybrid resin.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

These and/or other aspects of embodiments will become apparent and more readily appreciated from the following description of the exemplary embodiments, taken in conjunction with the accompanying drawings in which.

DETAILED DESCRIPTION

Figure 1:
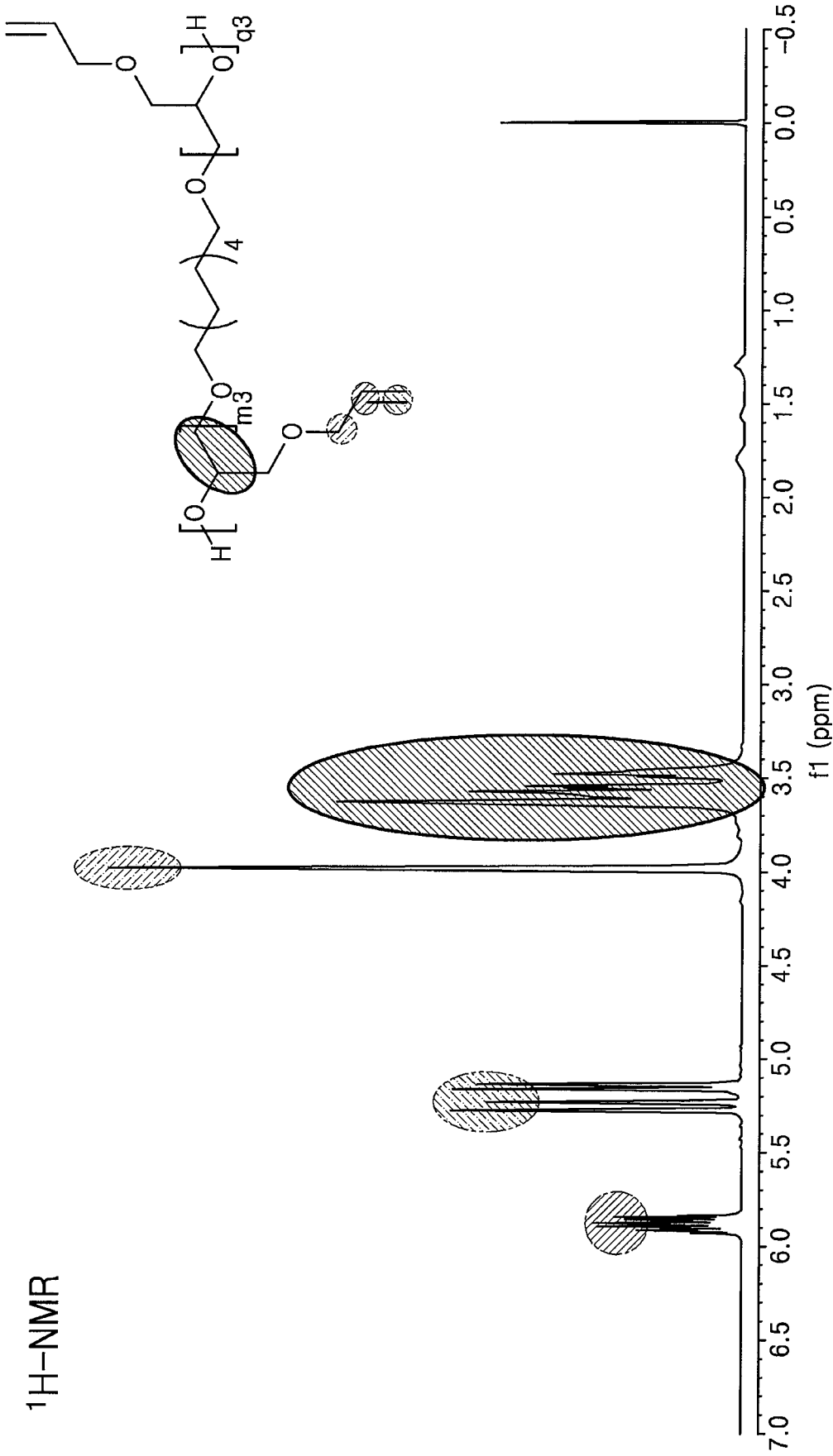
FIG. 1 is a graph illustrating a measurement result of $^1$H-NMR performed on the poly(allyl glycidyl ether)-poly (ethylene oxide) block copolymer (PAGE-b-PEO) prepared according to Synthesis Example 1.

Reference will now be made in more detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of embodiments of the present description.

A composition for preparing a hybrid resin according to an exemplary embodiment may include:

a polymer containing a repeating unit derived from allyl glycidyl ether;

a thiol-based compound; and a photoinitiator.

For example, the polymer may be selected from a poly (allyl glycidyl ether) (PAGE) homopolymer, a poly(allyl glycidyl ether)-poly(methyl methacrylate) (PAGE-PMMA) copolymer, a poly(allyl glycidyl ether)-poly(ethylene oxide) (PAGE-PEO) copolymer, a poly(allyl glycidyl ether)-polystyrene (PAGE-PS) copolymer, a polystyrene-poly(allyl glycidyl ether)-poly(ethylene oxide) (PS-PAGE-PEO) copolymer, and a poly(methyl methacrylate)-poly(allyl glycidyl ether)-polyethylene oxide (PMMA-PAGE-PEO) copolymer, but embodiments are not limited thereto.

The copolymer may include an alternating copolymer, a random copolymer, a block copolymer, or a graft copolymer.

In some embodiments, the copolymer may include a block copolymer.

In some embodiments, the polymer may include a poly (allyl glycidyl ether)-poly(ethylene oxide) block copolymer (PAGE-b-PEO).

The polymer may have a weight average molecular weight (Mw) in a range of about 1,000 g/mol to about 100,000 g/mol (or about 1,000 daltons to about 100,000 daltons), e.g., about 10,000 g/mol to about 20,000 g/mol (or about 10,000 daltons to about 20,000 daltons). When a weight average molecular weight (Mw) of the polymer is within these ranges, synthesis of the composition may be easily carried out, and a hybrid resin prepared therefrom may have robust physical properties.

The thiol-based compound may include a first thiol-based compound containing a silyl group, a second thiol-based compound containing a moiety derived from a photochromic compound, or a combination thereof. As used herein, the terms "combination thereof" and "combinations thereof" may refer to a chemical combination (e.g., an alloy or chemical compound), a mixture, or a laminated structure of components.

The term "thiol-based compound," as used herein, may refer to a compound containing at least one mercapto group (—SH).

In some embodiments, the first thiol-based compound may be represented by Formula 1:

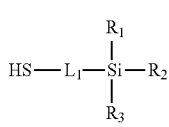

Formula 1 wherein, in Formula 1, $L_1$ may be selected from a substituted or unsubstituted $C_1$-$C_{20}$ alkylene group, a substituted or unsubstituted $C_3$-$C_8$ cycloalkylene group, and a substituted or unsubstituted $C_6$-$C_{20}$ arylene group, and $R_1$ to $R_3$ may be each independently selected from a substituted or unsubstituted $C_1$-$C_{20}$ alkoxy group, a substituted or unsubstituted $C_1$-$C_{20}$ alkyl group, a substituted or unsubstituted $C_3$-$C_8$ cycloalkyl group, and a substituted or unsubstituted $C_6$-$C_{20}$ aryl group.

A substituent of the substituted $C_1$-$C_{20}$ alkylene group, the substituted $C_3$-$C_8$ cycloalkylene group, the substituted $C_6$-$C_{20}$ arylene group, the substituted $C_1$-$C_{20}$ alkoxy group, the substituted $C_1$-$C_{20}$ alkyl group, the substituted $C_3$-$C_8$ cycloalkyl group, and the substituted $C_6$-$C_{20}$ aryl group may be selected from a deuterium, a cyano group, an amino group, an amidino group, a nitro group, a $C_1$-$C_{10}$ alkyl group, and a $C_1$-$C_{10}$ alkoxy group, but embodiments are not limited thereto.

In some embodiments, in Formula 1, $L_1$ may be a substituted or unsubstituted $C_1$-$C_{20}$ alkylene group, and $R_1$ to $R_3$ may be each independently selected from a substituted or unsubstituted $C_1$-$C_{20}$ alkoxy group and a substituted or unsubstituted $C_1$-$C_{20}$ alkyl group.

In some embodiments, in Formula 1, $L_1$ may be a substituted or unsubstituted $C_1$-$C_{20}$ alkylene group, and $R_1$ to $R_3$ may be each independently a substituted or unsubstituted $C_1$-$C_{20}$ alkoxy group.

In some embodiments, in Formula 1, $L_1$ may be selected from a methylene group, an ethylene group, a propylene group, a butylene group, a pentylene group, a hexylene group, a heptylene group, an octylene group, a nonylene group, and a decylene group, and $R_1$ to $R_3$ may be each independently selected from a methoxy group, an ethoxy group, an iso-propoxy group, an n-butoxy group, a sec-butoxy group, and a tert-butoxy group, but embodiments are not limited thereto.

The first thiol-based compound may include mercaptomethyl methyl diethoxysilane, 3-mercaptopropyl methyl dimethoxysilane, 3-mercaptopropyl triethoxysilane, 3-mercaptopropyl trimethoxysilane, 11-mercaptoundecyl trimethoxysilane or a combination thereof.

The photochromic compound of the second thiol-based compound (e.g., the moiety derived from the photochromic compound) may include an anthraquinone-based dye, a methine-based dye, an azomethine-based dye, an oxazine-based dye, an azo-based dye, a styryl-based dye, a coumarin-based dye, a porphyrin-based dye, a dibenzofuranone-based dye, a rhodamine-based dye (e.g., a rhodamine B base dye), a xanthene-based dye, or a combination thereof.

In some embodiments, the photochromic compound in the second thiol-based compound may include a rhodamine B base dye, but embodiments are not limited thereto.

The term "photochromic compound," as used herein, may refer to a compound having a photochromic property due to light or heat.

A molar ratio of an allyl group in the polymer to a mercapto group (—SH) in the thiol-based compound may be in a range of about 1:9 to about 9:1. When the molar ratio of an allyl group in the polymer to a mercapto group (—SH) in the thiol-based compound is within this range, by changing the molar ratio of an allyl group in the polymer to a mercapto group (—SH) in the thiol-based compound, characteristics of a hybrid resin may be easily controlled.

The thiol-based compound may include a combination (e.g., a reaction product) of the first thiol-based compound and the second thiol-based compound, wherein, a molar ratio of a mercapto group (—SH) in the first thiol-based compound to a mercapto group (—SH) in the second thiol-based compound may be in a range of about 1:0.05 to about 1:1. When the molar ratio of a mercapto group (—SH) in the first thiol-based compound to a mercapto group (—SH) in the second thiol-based compound is within this range, a hybrid resin having characteristics of both of the first thiol-based compound and the second thiol-based compound may be prepared.

The photoinitiator may include 2,2-dimethoxy-2-phenylacetophenone (DMPA), benzoyl peroxide, 2,2-diethoxyacetophenone, 3-hydroxyacetophenone, 1-hydroxy cyclohexyl phenyl ketone, benzophenone, 2-hydroxy-2-methylpropiophenone, 2,2-diethoxyacetophenone, or a combination thereof, but embodiments are not limited thereto.

In some embodiments, the photoinitiator may include 2,2-DMPA.

The amount (e.g., weight) of the photoinitiator may be, based on the amount (e.g., weight) of the composition for preparing a hybrid resin, in a range of about 0.1 weight % (wt %) to about 2 wt %, e.g., about 0.7 wt % to about 1 wt %. When the amount (e.g., weight) of the photoinitiator is within these ranges, photocuring may occur effectively, a reaction time may be prolonged, and an unreacted monomer may be prevented from remaining (or an amount of unreacted monomer may be reduced).

The composition for preparing a hybrid resin may include at least one selected from a solvent and a catalyst.

The solvent may include any suitable organic solvent available for use in the art. For example, the solvent may be selected from chloroform, dimethylformamide (DMF), methyl ethyl ketone (MEK), methyl isobutyl ketone (MIBK), dimethyl sulfoxide (DMSO), tetrahydrofuran (THF), toluene, acetone, hexane, cyclohexane, dichloromethane, dichloroethane, ethyl acetate, acetonitrile, isopropanol, carbon tetrachloride ($CCl_4$), xylene, pyridine, pentane, ethylbenzene, bromodichloromethane, trichloroethylene, hexamethylphosphoramide (HMPA), and a combination thereof, but embodiments are not limited thereto.

The catalyst may be selected from lithium hydroxide, sodium hydroxide, potassium hydroxide, cesium hydroxide, calcium hydroxide, barium hydroxide, and a combination thereof, but embodiments are not limited thereto.

The amount (e.g., weight) of the catalyst may be, based on the amount (e.g., weight) of the composition for preparing a hybrid resin, in a range of about 0.1 wt % to about 2 wt %. When the amount (e.g., weight) of the catalyst is within these ranges, photocuring may occur effectively, a reaction time may be prevented from being prolonged (or the reaction time may be reduced), and an unreacted monomer may be prevented from remaining (e.g., an amount of unreacted monomer remaining may be reduced).

The composition for preparing a hybrid resin may further include a small amount of water. The amount (e.g., weight) of water may be, based on the amount (e.g., weight) of the composition for preparing a hybrid resin, in a range of about 0.1 wt % to about 1 wt %.

According to another exemplary embodiment, a hybrid resin may be formed by photocuring by a thiol-ene reaction between the polymer and the thiol-based compound in the composition for preparing a hybrid resin.

The photocuring may be performed, e.g., by irradiating light having a wavelength in a range of about 280 nanometers (nm) to about 380 nm for about 10 minutes to about 4 hours.

The hybrid resin may include at least one selected from a repeating unit represented by Formula 2 and a repeating unit represented by Formula 3:

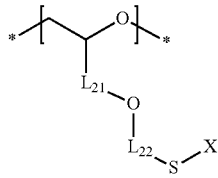

Formula 2

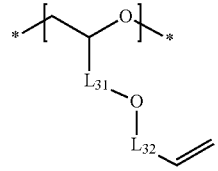

Formula 3 wherein, in Formulae 2 and 3, $L_{11}$, $L_{12}$, $L_{21}$, and $L_{22}$ may be each independently a substituted or unsubstituted $C_1$-$C_{20}$ alkylene group, $L_1$ may be selected from a substituted or unsubstituted $C_1$-$C_{20}$ alkylene group, a substituted or unsubstituted $C_3$-$C_8$ cycloalkylene group, and a substituted or unsubstituted $C_6$-$C_{20}$ arylene group, $R_1$ to $R_3$ may be each independently selected from a substituted or unsubstituted $C_1$-$C_{20}$ alkoxy group, a substituted or unsubstituted $C_1$-$C_{20}$ alkyl group, a substituted or unsubstituted $C_3$-$C_8$ cycloalkyl group, and a substituted or unsubstituted $C_8$-$C_{20}$ aryl group, and X may be a moiety derived from a photochromic compound.

The hybrid resin may further include a repeating unit represented by Formula 4:

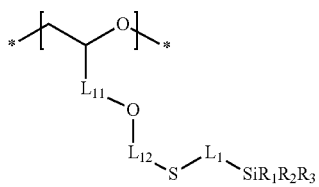

Formula 4 wherein, in Formula 4, $L_{31}$ and $L_{32}$ may be each independently a substituted or unsubstituted $C_1$-$C_{20}$ alkylene group.

According to an exemplary embodiment, a hybrid resin may be represented by Formula A or B:

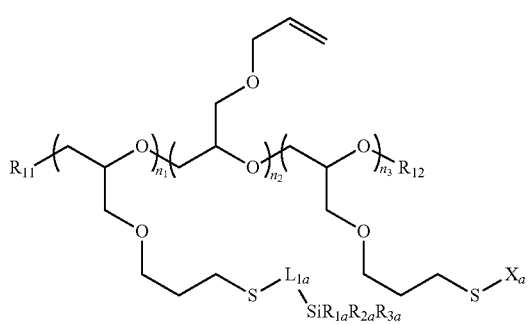

Formula A

-continued

Formula B

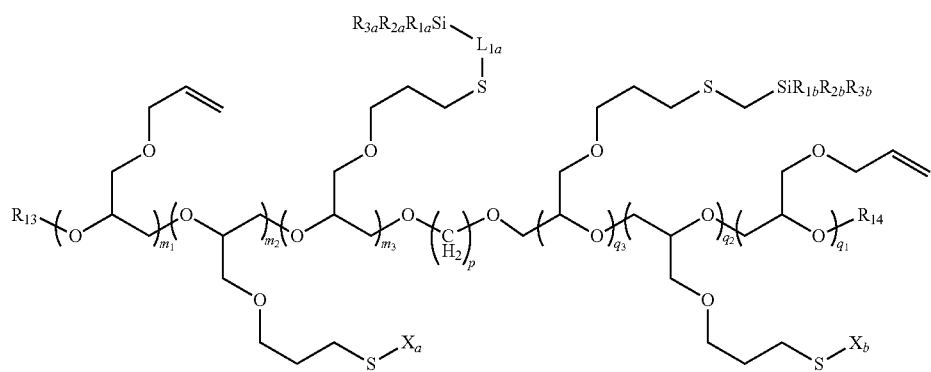

wherein, in Formulae A and B, $R_{11}$ to $R_{14}$ may be each independently selected from hydrogen, a substituted or unsubstituted $C_1$-$C_{20}$ alkyl group, and a substituted or unsubstituted $C_6$-$C_{20}$ aryl group, $L_{1a}$ and $L_{1b}$ may be each independently selected from a substituted or unsubstituted $C_1$-$C_{20}$ alkylene group, a substituted or unsubstituted $C_3$-$C_8$ cycloalkylene group, and a substituted or unsubstituted $C_6$-$C_{20}$ arylene group, $R_{1a}$ to $R_{3a}$ and $R_{1b}$ to $R_{3b}$ may be each independently selected from a substituted or unsubstituted $C_1$-$C_{20}$ alkoxy group, a substituted or unsubstituted $C_1$-$C_{20}$ alkyl group, a substituted or unsubstituted $C_3$-$C_8$ cycloalkyl group, and a substituted or unsubstituted $C_8$-$C_{20}$ aryl group, $X_a$ and $X_b$ may each be a moiety derived from a photochromic compound, $n_1$, $n_2$, $n_3$, $m_1$, $m_2$, $m_3$, $q_1$, $q_2$, $q_3$, and p may indicate their corresponding number of repeating units, $n_1$ may be an integer selected from 0 to 200, $n_2$ may be an integer selected from 0 to 200, $n_3$ may be an integer selected from 0 to 200, provided that a sum of $n_1$ and $n_3$ is 1 or more, $m_1$ may be an integer selected from 0 to 100, $m_2$ may be an integer selected from 0 to 100, $m_3$ may be an integer selected from 0 to 100, provided that a sum of $m_2$ and $m_3$ is 1 or more, $q_1$ may be an integer selected from 0 to 100, $q_2$ may be an integer selected from 0 to 100, $q_3$ may be an integer selected from 0 to 100, provided that a sum of $q_2$ and $q_3$ is 1 or more, and p may be an integer selected from 1 to 20.

In some embodiments, in Formulae A and B, $R_{1a}$ to $R_{3a}$ and $R_{1b}$ to $R_{3b}$ may be each independently selected from a substituted or unsubstituted $C_1$-$C_{20}$ alkoxy group and a substituted or unsubstituted $C_1$-$C_{20}$ alkyl group.

In some embodiments, in Formulae A and B, $L_{1a}$ and $L_{1b}$ may be each independently a substituted or unsubstituted $C_1$-$C_{20}$ alkylene group, and $R_{1a}$ to $R_{3a}$ and $R_{1b}$ to $R_{3b}$ may be each independently a substituted or unsubstituted $C_1$-$C_{20}$ alkoxy group, but embodiments are not limited thereto.

According to some embodiments, a hybrid resin film may be formed by heat curing the hybrid resin.

The hybrid resin film according to an embodiment may be formed on the substrate, e.g., by providing a substrate with the hybrid resin and curing, e.g., heat curing, the provided hybrid resin.

A substrate may be provided with the hybrid resin using a suitable method. For example, a suitable method, such as bar coating, spin coating, dipping, spray coating, and/or ink-jet printing may be used.

After providing the substrate with the hybrid resin, heating treatment may be performed for curing. In this regard, heating treatment may be performed, e.g., at a temperature of about 70° C. to about 150° C. for about 30 minutes to about 3 hours.

Since the hybrid resin film may have excellent light transmittance and flexibility, the hybrid resin film may be used, for example, as an optical film material or transparent conductive material in, for example, an optical device, an optical lens, a display, a solar cell, an organic light-emitting device (OLED, e.g., as lighting), a light-emitting device (LED, e.g., as lighting), or electronic paper, but embodiments are not limited thereto.

Hereinafter the composition for preparing a hybrid resin, the hybrid resin, and the hybrid resin film prepared therefrom according to embodiments will be described in more detail with reference to Synthesis Examples and Examples; however, the present disclosure is not limited thereto. In the Synthesis Examples, "Et" refers to an ethyl group.

EXAMPLE

Synthesis Example 1

Poly(allyl glycidyl ether)-poly(ethylene oxide) block copolymer (PAGE-b-PEO) was synthesized according to Reaction Scheme 1:

<Reaction Scheme 1>

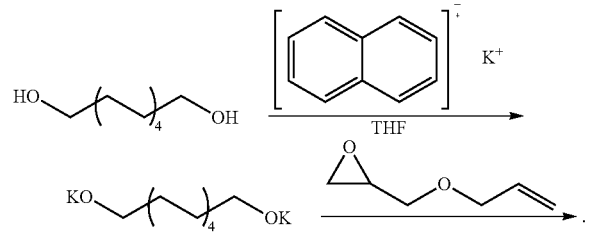

In an argon atmosphere, 0.23 g (1.3 mmol) of decan-1, 4-diol was dissolved in 100 mL of anhydrous THF to prepare a solution. 9.0 mL (2.9 mmol) of a potassium naphthalenide (0.32 molar (M) in THF) solution was slowly added dropwise thereto until the prepared solution showed a dark green color. 30 g (0.26 mol) of allyl glycidyl ether was added thereto, and then stirred at a temperature of about 40° C. for about 24 hours, thereby obtaining 21 g of PAGE-b-PEO. The weight average molecular weight (Mw) of PAGE-b-PEO was about 14,700 g/mol (or about 14,700 daltons), m3 was about 63, and q3 was about 63. The measurement result of 1H-NMR performed on PAGE-b-PEO is shown in FIG. 1.

Example 1

Figure 2:
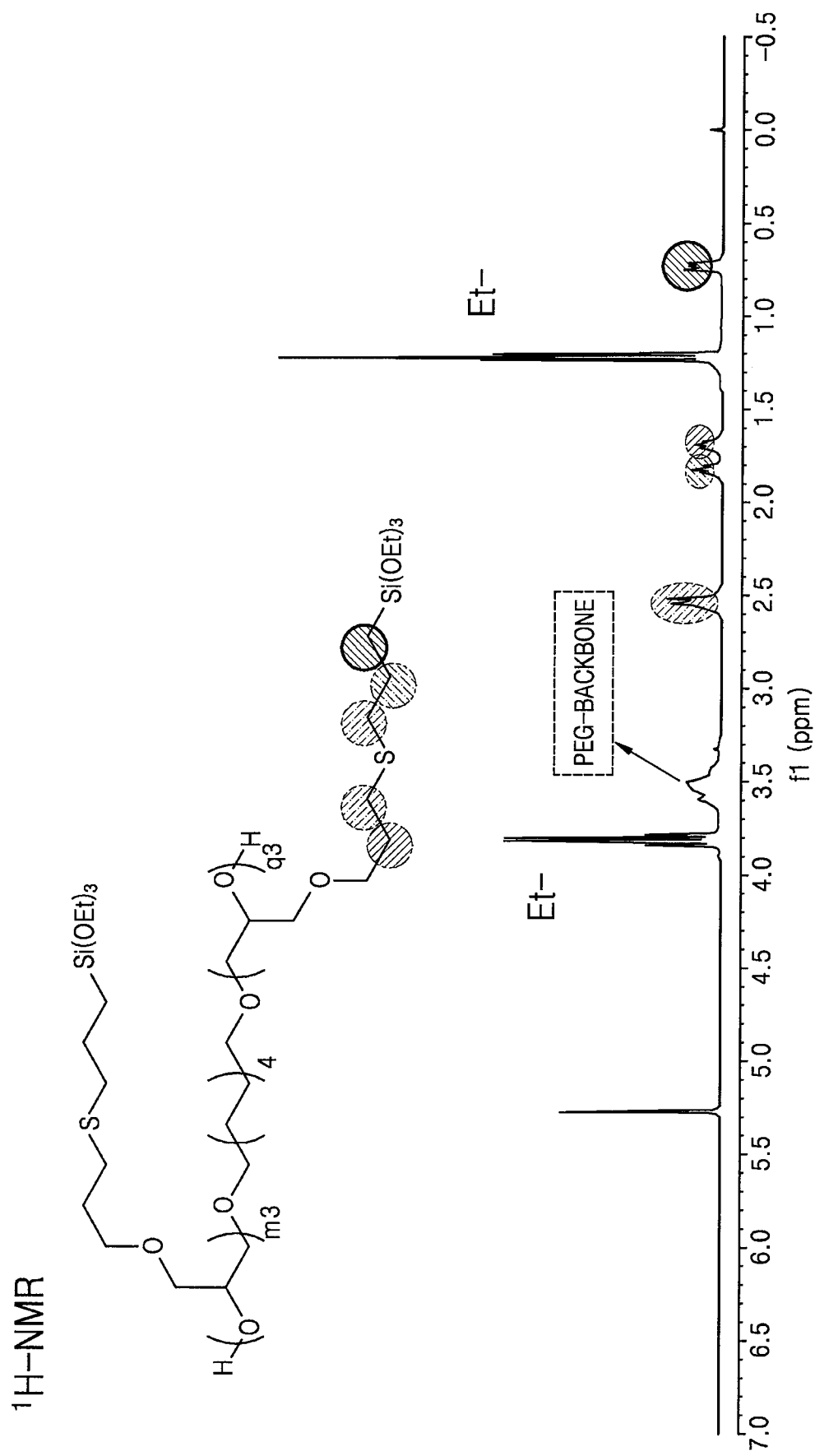
FIG. 2 is a graph illustrating a measurement result of $^1$H-NMR performed on Hybrid resin 1 prepared according to Example 1.

To a reaction vessel, 0.40 g (3.5 mmol) of PAGE-b-PEO prepared according to Synthesis Example 1, 1.0 g (4.2 mmol) of 3-mercaptopropyl triethoxysilane (a molar ratio of an allyl group to a mercapto group=1:1.2), 9.0 mg (0.035 mmol) of 2,2-DMPA, and 5 mL of toluene were added. Then, the resultant mixture was irradiated with light (thiol-ene reaction) for about 30 minutes by using a UV-A lamp (FL8BL-B lamps, Hitachi, 10×8 W) of a UV irradiation apparatus (Model LZC-ORG, Luzchem Research, Inc.), thereby obtaining 1.2 g of Hybrid resin 1 represented by the formula below. The weight average molecular weight (Mw) of Hybrid resin 1 was about 45,000 g/mol (or about 45,000 daltons), $m_3$ was about 63, and $q_3$ was about 63. The measurement result of $^1$H-NMR performed on Hybrid resin 1 is shown in FIG. 2.

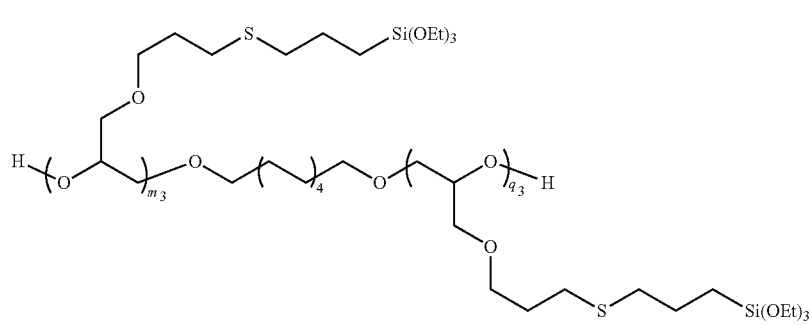

Evaluation Example 1

Two glass substrates each having a thickness of about 1 mm were each bar-coated with 0.5 g of Hybrid resin 1 prepared according to Example 1 to have a thickness of about 150 μm using a No. 65 wire bar coater (available from RDS) and about 20 μm using a No. 8 wire bar coater (available from RDS), respectively. In addition, a PET substrate having a thickness of about 0.1 mm was bar-coated with Hybrid resin 1 using No. 8 wire bar coater to have a thickness of about 20 μm.

Then, the three substrates were dried in an oven that was preheated at a temperature of about 80° C. for about 10 minutes, and then, placed again in an oven that was preheated at a temperature of about 130° C. for about 1 hour to perform heat curing, thereby preparing Hybrid resin films (1), (2), and (3).

Figure 3A:
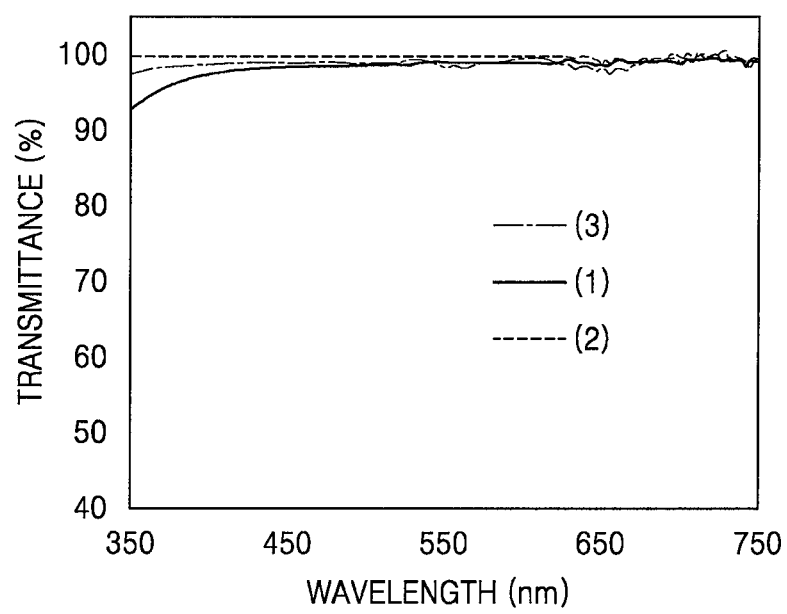
FIG. 3A is a graph of a transmittance measurement result of Hybrid resin films (1), (2), and (3) prepared according to Evaluation Example 1.
Figure 3B:
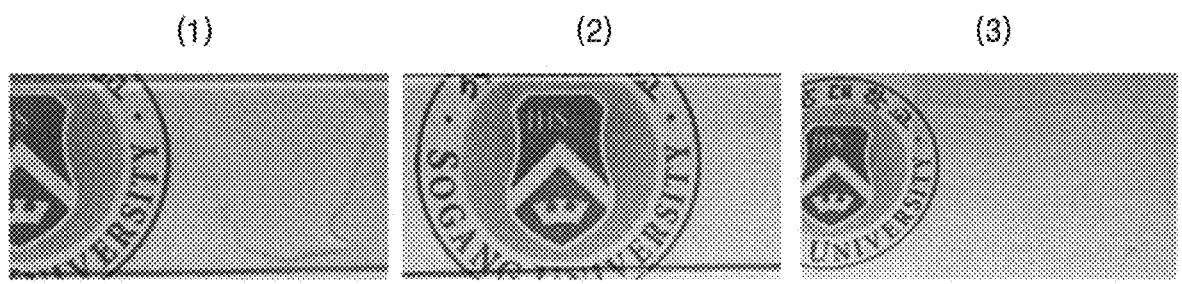
FIG. 3B are images of Hybrid resin films (1), (2), and (3) prepared according to Evaluation Example 1.

Using a spectrophotometer (V-660 UV-visible spectrometer, available from JASCO), transmittances (light transmittances) of Hybrid resin films (1), (2), and (3) were measured. FIG. 3A is a graph of wavelength (nm) versus transmittance (percent, %) of Hybrid resin films (1), (2), and (3). FIG. 3B are images that show Hybrid resin films (1), (2), and (3) had excellent transmittance.

Referring to FIGS. 3A and 3B, it was found that Hybrid resin films (1), (2), and (3) had excellent transmittance (light transmittance), e.g., 92% or more transmittance.

Synthesis Example 2

Photochromic compound 1 was synthesized following Reaction Scheme 2:

Reaction Scheme 2

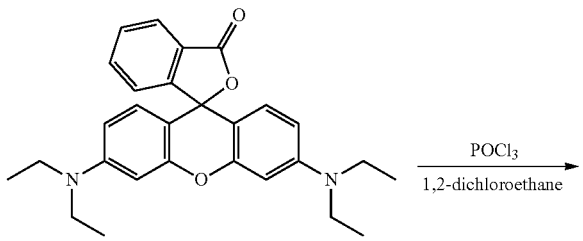

Hybrid resin 1

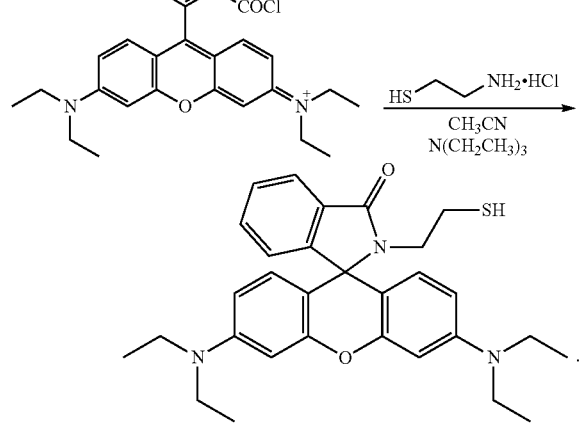

Photochromic compound 1

To a reaction vessel, 1.7 g (3.8 mmol) of rhodamine B base, 1.3 mL (14 mmol) of POCl$_3$, and 40 mL of 1,2-dichloroethane were added, and then, stirred at a temperature of about 90° C. for about 4 hours. Once the reaction was complete, the mixture was cooled to room temperature, and the solvent was removed therefrom under reduced pressure.

Rhodamine B acyl chloride was obtained therefrom, and then dissolved in 80 mL of acetonitrile. At a temperature of about 0° C., 0.52 g (4.6 mmol) of cysteamine hydrochloride and 1.5 g (7.7 mmol) of triethylamine were added thereto, and then stirred for about 1 hour, followed by additional stirring at room temperature for about 8 hours. Once the reaction was complete, the solvent was removed therefrom under reduced pressure, and purple-colored residue was obtained therefrom. The residue was purified through column chromatography (dichloromethane:methanol volume ratio=20:1), thereby obtaining 1.3 g of Photochromic compound 1.

Example 2

Figure 4:
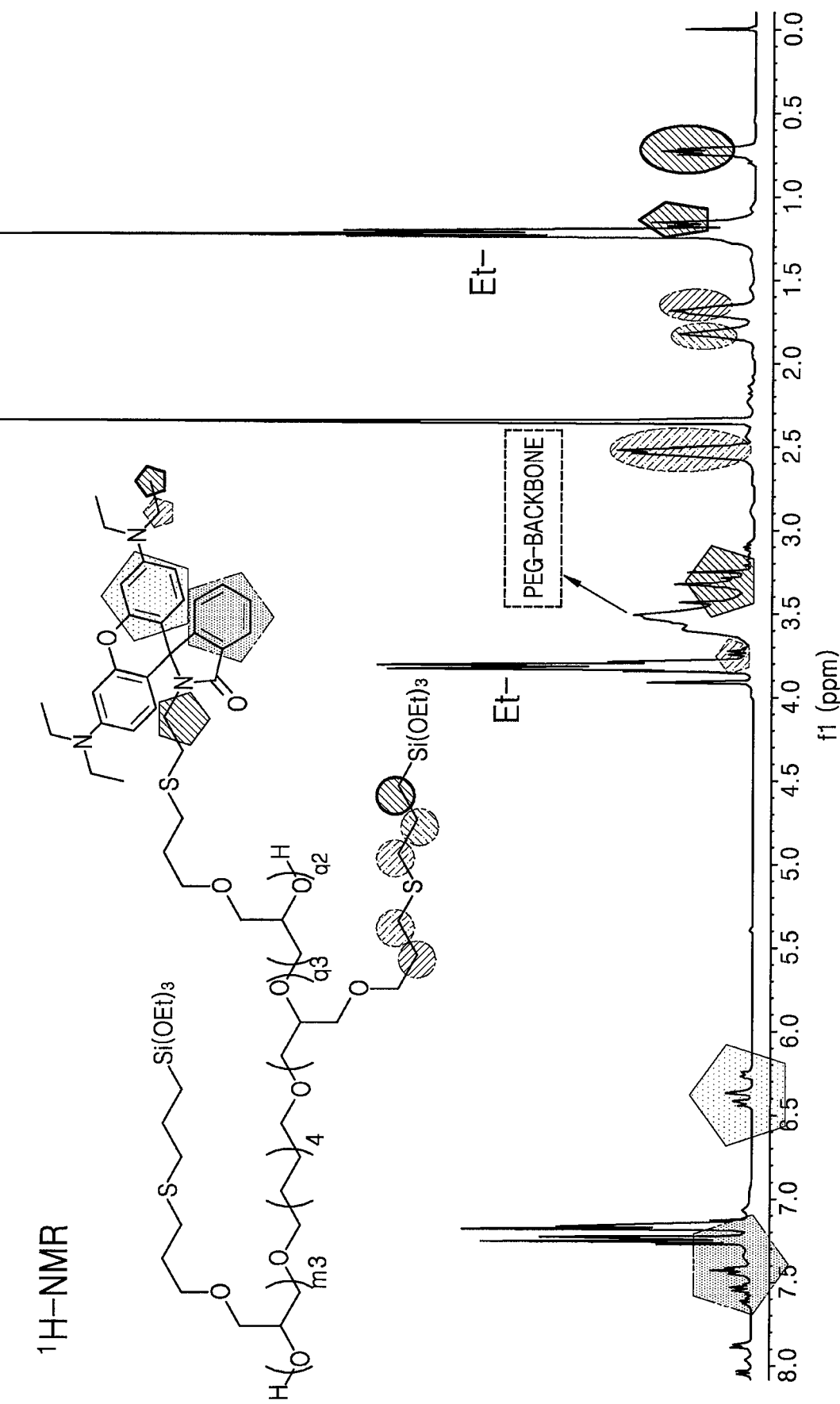
FIG. 4 is a graph illustrating a measurement result of $^1$H-NMR performed on Hybrid resin 2 prepared according to Example 2.

To a reaction vessel, 0.41 g (3.6 mmol) of PAGE-b-PEO prepared according to Synthesis Example 1, 0.83 g (3.4 mmol) of 3-mercaptopropyl triethoxysilane (a molar ratio of allyl group:a mercapto group=1:0.95), 91 mg (0.18 mmol) of Photochromic compound 1 (a molar ratio of allyl group:a mercapto group=1:0.05) prepared according to Synthesis Example 2, 37 mg (0.15 mmol) of DMPA, and 5 mL of toluene were added. Then, the resultant mixture was irradiated with light (thiol-ene reaction) for about 4 hours by using a UV-A lamp (FL8BL-B lamps, Hitachi, 10×8 W), thereby obtaining 1.2 g of Hybrid resin 2 represented by the formula below. The weight average molecular weight (Mw) of Hybrid resin 2 was about 47,000 g/mol (or about 47,000 daltons), $m_3$ was about 60, $q_3$ was about 60, and $q_2$ was about 6. The measurement result of $_1$H-NMR performed on Hybrid resin 2 is shown in FIG. 4.

irradiated with light for about 10 minutes by using a UV-A lamp (FL8BL-B lamps, Hitachi, 10×8 W) (Operation 4). Thereafter, the film was re-heated in an oven at a temperature of about 130° C. for about 1 hour (Operation 5). Then, the hybrid resin film was irradiated with light for about 10 minutes by using a UV-A lamp (FL8BL-B lamps, Hitachi, 10×8 W) (Operation 6). Thereafter, the film was re-heated in an oven at a temperature of about 130° C. for about 1 hour (Operation 7).

The color change of the film from Operation 1 to Operation 7 was observed with the naked eye. Additionally, fluorescent emission of the film under irradiation of light of 254 nm was observed. The result thereof is shown in FIG. 5.

Figure 5:
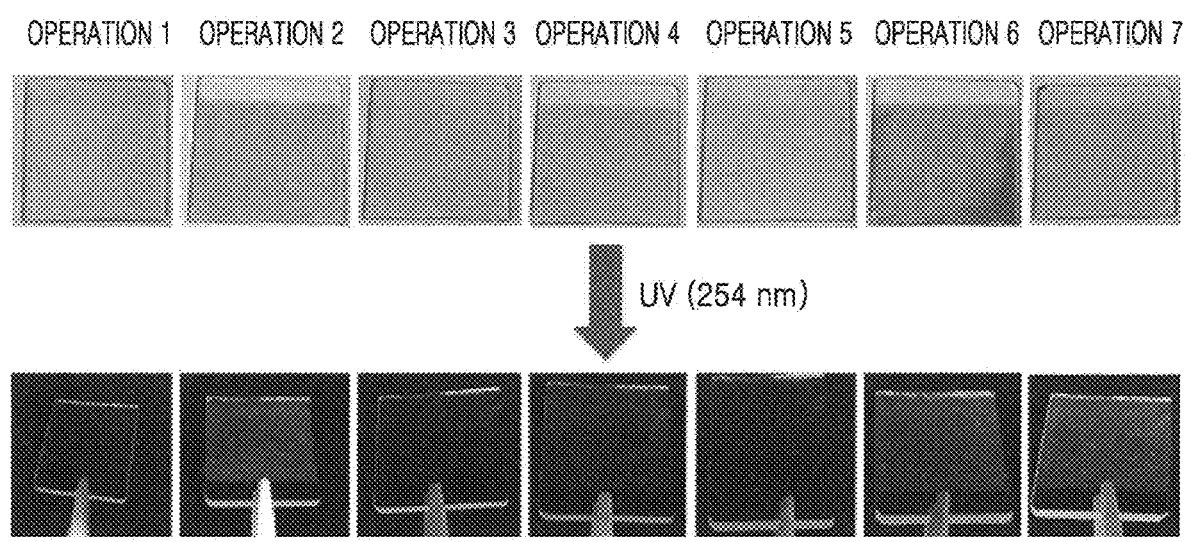
FIG. 5 is a series of images illustrating a photochromism observation result (above) of hybrid resin film prepared according to Evaluation Example 2 due to light/heat and a fluorescent emission characteristics observation result (below) of hybrid resin films prepared according to Evaluation Example 2 due to light/heat.

Referring to FIG. 5, it was found that the hybrid resin film prepared according to Evaluation Example 2 had a photochromic property due to light/heat (above) and fluorescent emission characteristics (below).

Figure 6:
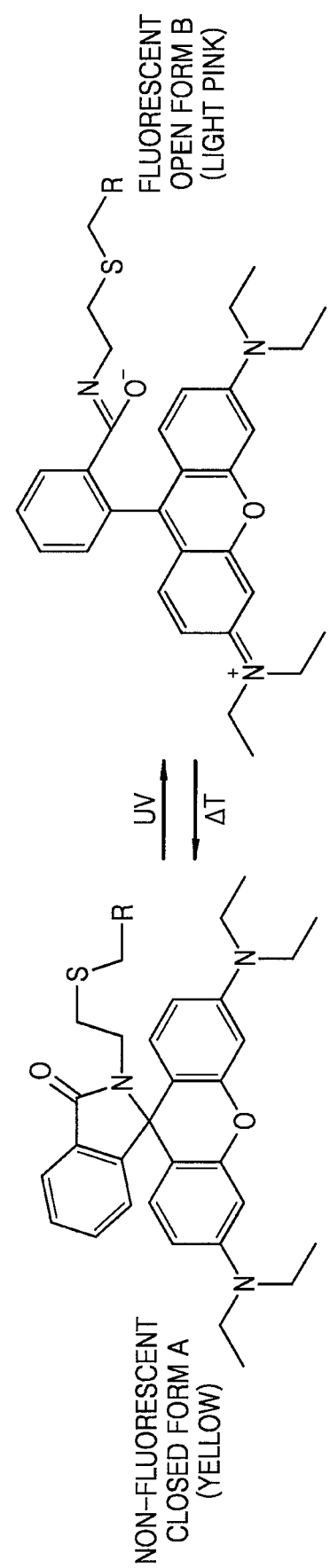
FIG. 6 is a reaction scheme illustrating a photochromic mechanism due to light/heat of Photochromic compound 1.

FIG. 6 illustrates a photochromic mechanism due to light/heat of Photochromic compound 1. Referring to FIG. 6, the molecular structure of Photochromic compound 1 changed due to light/heat, thus having photochromic characteristics and fluorescent emission characteristics.

Figure 7:
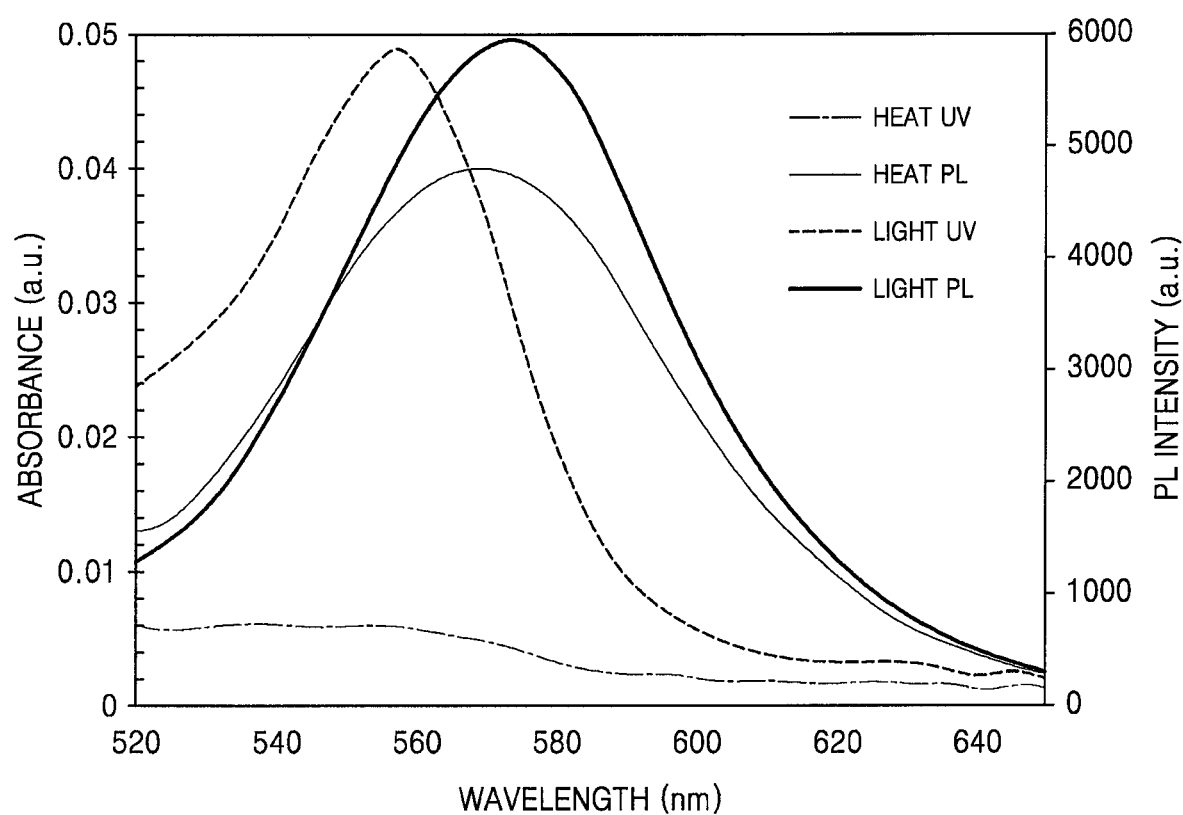
FIG. 7 is a graph of a measurement result of a hybrid resin film of ultraviolet (UV) (V-660 UV-visible spectrometer, available from Jasco) and photoluminescence (PL) spectrum (F-7000 Fluorescence spectrometer, available from Hitachi) in Operations 2 and 3 according to Evaluation Example 2.

FIG. 7 is a graph of the measurement result of UV (measured by V-660 UV-visible spectrometer, available from JASCO) and PL spectrum (measured by F-7000 Fluorescence spectrometer, available from Hitachi) in Operations 2 and 3 in Evaluation

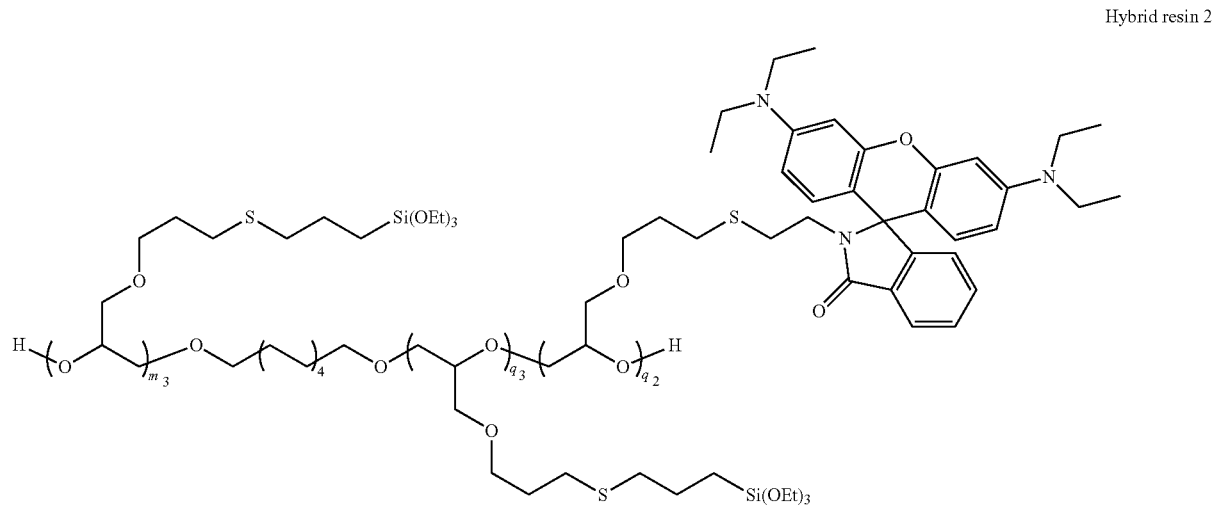

Hybrid resin 2

Evaluation Example 2

A glass substrate (20 mm×20 mm×1 mm) was bar-coated with 0.2 g of Hybrid resin 2 prepared according to Example 2 to a thickness of about 40 μm by using a No. 18 wire bar coater (available from RDS). The glass substrate was heat-cured in an oven at a temperature of about 130° C. for about 1 hour, thereby preparing a hybrid resin film (Operation 1). Then, the hybrid resin film was irradiated with light for about 10 minutes by using a UV-A lamp (FL8BL-B lamps, Hitachi, 10×8 W)(Operation 2). Thereafter, the film was re-heated in an oven at a temperature of about 130° C. for about 1 hour (Operation 3). Then, the hybrid resin film was Example 2

Referring to FIG. 7, it was found that the hybrid resin film prepared according to Evaluation Example 2 had a photochromic property and fluorescent emission characteristics due to light/heat.

As described above, according to one or more exemplary embodiments, provided is a novel composition for preparing a hybrid resin, a hybrid resin, and a hybrid resin film prepared therefrom.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section.

Thus, a first element, component, region, layer or section described below could be termed a second element, component, region, layer or section, without departing from the spirit and scope of the present disclosure. For example, although the present disclosure refers to a "first thiol-based compound containing a silyl group," the thiol-based compound is not limited by the term "first."

It will be understood that when an element or layer is referred to as being "on" another element or layer, it can be directly on the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present disclosure. As used herein, the singular forms "a" and "an" are intended to include the plural forms as well, unless the context clearly indicates otherwise. For example, although the present disclosure refers to "a polymer containing a repeating unit," it will be understood that, unless stated otherwise, the polymer may contain a plurality of repeating units that may be different from one another. It will be further understood that the terms "comprises," "comprising," "includes," and "including," when used in this specification, specify the presence of the stated features, integers, acts, operations, elements, and/or components, but do not preclude the presence or addition of one or more other features, integers, acts, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the terms "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

While one or more exemplary embodiments have been described with reference to the figures, it will be understood by those of ordinary skill in the art that various changes in form and details may be made therein without departing from the spirit and scope as defined by the following claims, and equivalents thereof.

What is claimed is:

1. A composition for preparing a hybrid resin comprising:
   a polymer comprising a repeating unit derived from allyl glycidyl ether;
   a thiol-based compound; and
   a photoinitiator, wherein the thiol-based compound comprises a combination of a first thiol-based compound comprising a silyl group and a second thiol-based compound comprising a moiety derived from a photochromic compound, and
   the photochromic compound of the second thiol-based compound comprises an anthraquinone-based dye, a methine-based dye, an oxazine-based dye, a styryl-based dye, a coumarin-based dye, a porphyrin-based dye, a dibenzofuranone-based dye, a rhodamine-based dye, a xanthene-based dye, or a combination thereof.

2. The composition of claim 1, wherein the polymer is selected from a poly(allyl glycidyl ether) (PAGE) homopolymer, a poly(allyl glycidyl ether)-poly(methyl methacrylate) (PAGE-PMMA) copolymer, a poly(allyl glycidyl ether)-poly(ethylene oxide)(PAGE-PEO) copolymer, a poly(allyl glycidyl ether)-polystyrene (PAGE-PS) copolymer, a polystyrene-poly(allyl glycidyl ether)-poly(ethylene oxide) (PS-PAGE-PEO) copolymer, and a poly(methyl methacrylate)-poly(allyl glycidyl ether)-poly(ethylene oxide) (PMMA-PAGE-PEO) copolymer, and
   wherein the copolymer is selected from an alternating copolymer, a random copolymer, a block copolymer, and a graft copolymer.

3. The composition of claim 1, wherein the polymer comprises a poly(allyl glycidyl ether)-poly(ethylene oxide) block copolymer (PAGE-b-PEO).

4. The composition of claim 1, wherein the polymer has a weight average molecular weight (Mw) in a range of 1,000 g/mol to 100,000 g/mol.

5. The composition of claim 1, wherein the first thiol-based compound is represented by Formula 1:

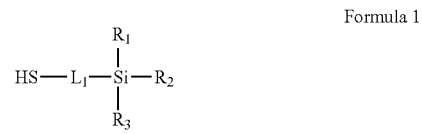

Formula 1 wherein, in Formula 1,
$L_1$ is selected from a substituted or unsubstituted $C_1$-$C_{20}$ alkylene group, a substituted or unsubstituted $C_3$-$C_8$ cycloalkylene group, and a substituted or unsubstituted $C_6$-$C_{20}$ arylene group, and
$R_1$ to $R_3$ are each independently selected from a substituted or unsubstituted $C_1$-$C_{20}$ alkoxy group, a substituted or unsubstituted $C_1$-$C_{20}$ alkyl group, a substituted or unsubstituted $C_3$-$C_8$ cycloalkyl group, and a substituted or unsubstituted $C_6$-$C_{20}$ aryl group.

6. The composition of claim 5, wherein, in Formula 1, $R_1$ to $R_3$ are each independently selected from a substituted or unsubstituted $C_1$-$C_{20}$ alkoxy group and a substituted or unsubstituted $C_1$-$C_{20}$ alkyl group.

7. The composition of claim 5, wherein, in Formula 1, $L_1$ is a substituted or unsubstituted $C_1$-$C_{20}$ alkylene group, and $R_1$ to $R_3$ are each independently a substituted or unsubstituted $C_1$-$C_{20}$ alkoxy group.

8. The composition of claim 1, wherein the first thiol-based compound comprises mercaptomethyl methyl diethoxysilane, 3-mercaptopropyl methyl dimethoxysilane, 3-mercaptopropyl triethoxysilane, 3-mercaptopropyl trimethoxysilane, 11-mercaptoundecyl trimethoxysilane or a combination thereof.

9. The composition of claim 1, wherein the photochromic compound comprises a rhodamine B base dye.

10. The composition of claim 1, wherein a molar ratio of an allyl group in the polymer to a mercapto group (—SH) in the thiol-based compound is in a range of about 9:1 to about 1:9.

11. The composition of claim 1, wherein the thiol-based compound comprises a combination of the first thiol-based compound and the second thiol-based compound, wherein, a molar ratio of a mercapto group (—SH) in the first thiol-based compound to a mercapto group (—SH) in the second thiol-based compound is in a range of about 1:0.05 to about 1:1.

12. The composition of claim 1, wherein the photoinitiator comprises 2,2-dimethoxy-2-phenylacetophenone (DMPA), benzoyl peroxide, 2,2-diethoxyacetophenone, 3-hydroxyacetophenone, 1-hydroxy cyclohexyl phenyl ketone, benzophenone, 2-hydroxy-2-methylpropiophenone, 2,2-diethoxyacetophenone, or a combination thereof.

13. The composition of claim 1, further comprising at least one selected from a solvent and a catalyst.

14. A hybrid resin formed by photocuring by a thiol-ene reaction between the polymer and the thiol-based compound in the composition for preparing a hybrid resin of claim 1.

15. The hybrid resin of claim 14, comprising at least one selected from a repeating unit represented by Formula 2 and a repeating unit represented by Formula 3:

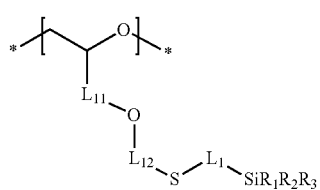

Formula 2

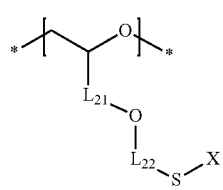

<Formula 3> wherein, in Formulae 2 and 3, $L_{11}$, $L_{12}$, $L_{21}$, and $L_{22}$ are each independently a substituted or unsubstituted $C_1$-$C_{20}$ alkylene group, $L_1$ is selected from a substituted or unsubstituted $C_1$-$C_{20}$ alkylene group, a substituted or unsubstituted $C_3$-$C_8$ cycloalkylene group, and a substituted or unsubstituted $C_6$-$C_{20}$ arylene group, $R_1$ to $R_3$ are each independently selected from a substituted or unsubstituted $C_1$-$C_{20}$ alkoxy group, a substituted or unsubstituted $C_1$-$C_{20}$ alkyl group, a substituted or unsubstituted $C_3$-$C_8$ cycloalkyl group, and a substituted or unsubstituted $C_6$-$C_{20}$ aryl group, and X is a moiety derived from a photochromic compound.

16. The hybrid resin of claim 15, further comprising a repeating unit represented by Formula 4:

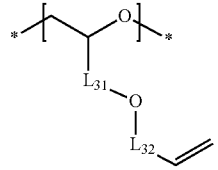

Formula 4 wherein, in Formula 4, $L_{31}$ and $L_{32}$ are each independently a substituted or unsubstituted $C_1$-$C_{20}$ alkylene group.

17. The hybrid resin of claim 14 represented by Formula A or B:

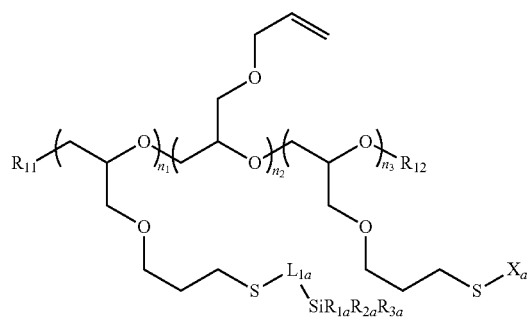

Formula A

-continued

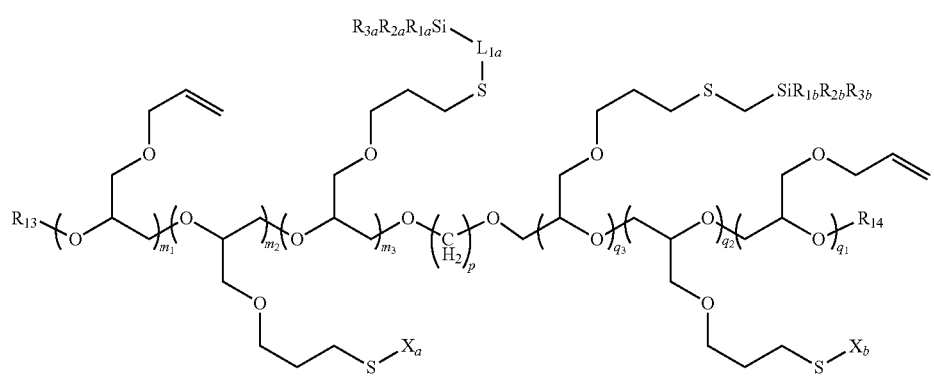

Formula B wherein, in Formulae A and B, $R_{11}$ to $R_{14}$ are each independently selected from hydrogen, a substituted or unsubstituted $C_1$-$C_{20}$ alkyl group, and a substituted or unsubstituted $C_6$-$C_{20}$ aryl group, $L_{1a}$ and $L_{1b}$ are each independently selected from a substituted or unsubstituted $C_1$-$C_{20}$ alkylene group, a substituted or unsubstituted $C_3$-$C_8$ cycloalkylene group, and a substituted or unsubstituted $C_6$-$C_{20}$ arylene group, $R_{1a}$ to $R_{3a}$ and $R_{1b}$ to $R_{3b}$ are each independently selected from a substituted or unsubstituted $C_1$-$C_{20}$ alkoxy group, a substituted or unsubstituted $C_1$-$C_{20}$ alkyl group, a substituted or unsubstituted $C_3$-$C_8$ cycloalkyl group, and a substituted or unsubstituted $C_6$-$C_{20}$ aryl group, $X_a$ and $X_b$ are each a moiety derived from a photochromic compound, $n_1$, $n_2$, $n_3$, $m_1$, $m_2$, $m_3$, $q_1$, $q_2$, $q_3$, and p indicate their corresponding number of repeating units, $n_1$ is an integer selected from 0 to 200, $n_2$ is an integer selected from 0 to 200, $n_3$ is an integer selected from 0 to 200, provided that a sum of $n_1$ and $n_3$ is 1 or more, $m_1$ is an integer selected from 0 to 100, $m_2$ is an integer selected from 0 to 100, $m_3$ is an integer selected from 0 to 100, provided that a sum of $m_2$ and $m_3$ is 1 or more, $q_1$ is an integer selected from 0 to 100, $q_2$ is an integer selected from 0 to 100, $q_3$ is an integer selected from 0 to 100, provided that a sum of $q_2$ and $q_3$ is 1 or more, and p is an integer selected from 1 to 20.

18. The hybrid resin of claim 17, wherein, in Formulae A and B, $L_{1a}$ and $L_{1b}$ are each independently a substituted or unsubstituted $C_1$-$C_{20}$ alkylene group, and $R_{1a}$ to $R_{3a}$ and $R_{1b}$ to $R_{3b}$ are each independently a substituted or unsubstituted $C_1$-$C_{20}$ alkoxy group.

19. A hybrid resin film formed by heat curing the hybrid resin according to claim 14.

* * * * *